(12) United States Patent
Chis

(10) Patent No.: US 9,650,265 B2
(45) Date of Patent: May 16, 2017

(54) DISINFECTION COMPOSITIONS AND METHODS

(71) Applicant: Claire, LLC, Raleigh, NC (US)

(72) Inventor: Cristian Vasile Chis, Durham, NC (US)

(73) Assignee: CLAIRE TECHNOLOGIES, LLC, Raleigh, NC (US)

( * ) Notice: Subject to any disclaimer, the term of this patent is extended or adjusted under 35 U.S.C. 154(b) by 0 days.

(21) Appl. No.: 14/980,323

(22) Filed: Dec. 28, 2015

(65) Prior Publication Data

US 2016/0257583 A1 Sep. 8, 2016

Related U.S. Application Data

(60) Provisional application No. 62/128,160, filed on Mar. 4, 2015.

(51) Int. Cl.
*A01N 59/16* (2006.01)
*A01N 25/08* (2006.01)
(Continued)

(52) U.S. Cl.
CPC ........ *C02F 1/505* (2013.01); *C02F 2103/002* (2013.01); *C02F 2103/008* (2013.01); *C02F 2103/023* (2013.01)

(58) Field of Classification Search
CPC .... A01N 59/16; A01N 2300/00; A01N 25/08; C02F 1/281; C02F 1/288; C02F 1/505;
(Continued)

(56) References Cited

U.S. PATENT DOCUMENTS

2008/0085230 A1* 4/2008 Evstratov ............... B82Y 30/00
423/210
2014/0120148 A1 5/2014 Chis

FOREIGN PATENT DOCUMENTS

EP 0 804 877 A1 11/1997
EP WO2013007289 * 1/2013 ............. A01N 25/08
(Continued)

OTHER PUBLICATIONS

Tartanson et al. (Water Research 2014 (online Jun. 24, 2014); 63:135-146).*
(Continued)

*Primary Examiner* — Ernst V Arnold
(74) *Attorney, Agent, or Firm* — Jenkins, Wilson, Taylor & Hunt, P.A.

(57) ABSTRACT

Provided herein are disinfection compositions, devices, systems and methods useful for decontamination and/or disinfection of water and other liquid solutions. The disclosed composite materials can comprise a germicidal surface comprising a support substrate, one or more micrometric aggregates of titanium oxide on the support substrate, the titanium oxide aggregates comprising chloride atoms, and one or more micrometric aggregates of silver attached to the chloride atoms of the titanium oxide aggregates, wherein the micrometric aggregates of titanium oxide with silver atoms have a germicidal activity. Methods of using the same for reducing or eliminating microorganisms in water or a fluid can comprise contacting water or fluid with microorganisms with the composite material, wherein the microorganisms in the water or fluid are reduced or eliminated from the water or fluid.

8 Claims, 2 Drawing Sheets

(51) Int. Cl.
  H04B 10/564 (2013.01)
  C02F 1/50 (2006.01)
  C02F 103/00 (2006.01)
  C02F 103/02 (2006.01)

(58) Field of Classification Search
  CPC .. H04B 10/506; H04B 10/564; H04J 14/0221
  See application file for complete search history.

(56) References Cited

FOREIGN PATENT DOCUMENTS

JP H08133919 A 5/1996
JP 2006-069935 A 3/2006

OTHER PUBLICATIONS

Goerne et al. (J Nanomed nanotechnol 2012;S-5: 7 pages).*
Chambers et al., "New Colloidal Silver Disinfectant—Effect of Environmental Factors on Bactericidal Action," Industrial and Engineering Chemistry, vol. 45, No. 11, pp. 2569-2571 (1953).
Sharma et al., "Disinfection of drinking water by filtration through silver impregnated Alumina," Journal of Environmental Science and Health, Part A: Environment Science and Engineering & Toxic and Hazardous Substance Control, vol. 25, No. 5, pp. 479-486 (Jul. 1990).
Malygin, "The molecular layering method as a basis of chemical nanotechnology," Natural Microporous Materials in Environmental Technology, Kluwer Academic Publishers, pp. 487-495 (1999).
Jos van Dillen et al., "Synthesis of supported catalysts by impregnation and drying using aqueous chelated metal complexes," Journal of Catalysis, vol. 216, pp. 257-264 (2003).
Zhang et al., "Preparation and characterization of antibacterial silver-dispersed activated carbon aerogels," Carbon, vol. 42, Issue 15, pp. 3209-3216 (2004).
Kwakye-Awuah et al., "Antimicrobial action and efficiency of silver-loaded zeolite X," Journal of Applied Microbiology, ISSN 1364-5072, vol. 104, pp. 1516-1524 (2008).
Rai et al., "Silver nanoparticles as a new generation of antimicrobials," Biotechnology Advances, vol. 27, Issue 1, pp. 76-83 (Jan.-Feb. 2009).
Zhang et al., "Immobilizing silver nanoparticles onto the surface of magnetic silica composite to prepare magnetic disinfectant with enhanced stability and antibacterial activity," Colloids and Surfaces A: Physicochemical and Engineering Aspects, vol. 375, Issue 1-3, pp. 186-192 (Feb. 5, 2011).
International Preliminary Report on Patentability and Written Opinion of the International Searching Authority for International Application No. PCT/EP2011/061689 dated Jan. 14, 2014.

* cited by examiner

DISINFECTION COMPOSITIONS AND METHODS

CROSS REFERENCE TO RELATED APPLICATION

This application claims priority to and the benefit of U.S. Provisional Patent Application Ser. No. 62/128,160, filed Mar. 4, 2015, the disclosure of which is incorporated herein by reference in its entirety.

TECHNICAL FIELD

The subject matter described herein relates to disinfection compositions, devices, systems and methods. More particularly, the present disclosure relates to the field of decontamination and/or disinfection, including water and other liquid solution decontamination.

BACKGROUND

The contamination of water or fluids with microorganisms remains a global problem. Contamination can be problematic for wastewater, bathing water, industrial water, grey water and/or drinking water. Currently, the primary means of disinfection is the addition of chemical compounds with high oxidation potential to the water, such as chloride ($ClO^-$ as an active specie) or bromide ($BrO^-$ as an active specie). However, these chemical products can be highly harmful to human health and the environment, especially when dosed continuously. Unfortunately, in many applications, such as hot tub water disinfection, the high concentrations of chemical oxidants necessary in order to assure a minimal health security can often induce eye and skin discomfort and irritation. Moreover, for wastewater plants, grey water or food industry water where the releases are often dropped in local rivers, lakes or oceans, the addition of chemicals as disinfectants is forbidden and/or highly regulated.

Some other solutions for water disinfection include reverse osmosis, ozone reactors and/or UV lighting. However, all rely upon electronic devices, and therefore are dependent on electricity.

Metal ions have also been used previously for water disinfection. Unfortunately, the use of such metal ions often requires the addition of the metal compounds directly to the media to be disinfected. Even where metal ions are bound to a substrate the disinfecting activity of the metal ions is often times compromised.

Accordingly, there remains a need for atmospheric disinfection compositions and methods that are safe and effective, as well as cost-effective.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

Disclosed herein is a composite material with germicide surfaces and uses thereof, such as for example for reducing or removing microorganisms from water.

The present disclosure thus relates especially to the use of a composite material comprising, in some embodiments, the following components (I), (II) and (III):

(I) a silica gel (or alumina) support, which can provide for in situ growth of (II) a layer or aggregation of aggregates comprised of titanium dioxide with chloride atoms, type TiO(Cl), which can act as bounding glue for (III) a silver (Ag) aggregates layer or aggregation which can provide for a germicide surface.

In some embodiments, the porous support forming the part (I) can comprise about 70% to about 90% of the total mass of the composite material. In some embodiments, the adhesive forming the part (II) can comprise about 3% to about 10% of the total mass of the composite material. In some embodiments, the germicide surface forming the part (III) can be comprise from about 10% to about 20% of the total mass of the composite material.

In some embodiments, the porous support can comprise silica gel with a specific area at least 440 m2/g. In other embodiments, the porous support can comprise alumina with a specific area of at least 260 m2/g.

According to another embodiment, aggregates composed of titanium dioxide with chloride atoms type TiO(Cl) can be in very smooth diamond shapes naturally structured and at least 5 to 10 micrometers in size.

According to another embodiment, the silver aggregates can be at least 250 nm in size in order to provide an active germicide surface and can reach, in some embodiments, up to about 500 nm to about 750 nm.

Thus, in some embodiments provided herein are composite materials with a germicidal surface comprising a support substrate, one or more micrometric aggregates of titanium oxide on the support substrate, the titanium oxide aggregates comprising chloride atoms, and one or more micrometric aggregates of silver attached to the chloride atoms of the titanium oxide aggregates, wherein the micrometric aggregates of titanium oxide with silver atoms have a germicidal activity. In some embodiments the support substrate comprises a silica gel or activated alumina, wherein the support substrate comprises a surface area of at least 50 $m^2/g$ and not more then 850 $m^2/g$. In some embodiments the support substrate can comprise a porous ceramic. In some embodiments the aggregates of titanium oxide with chloride atoms are of a size greater than about 250 nm and up to about 10,000 nm and cover partially the surface of the support substrate. In some embodiments the aggregates of titanium oxide with chloride atoms comprise no more than about 5 to about 7% by weight of the composite material.

In some embodiments the silver aggregates are larger than about 250 nm and up to about 1,000 nm and cover at least partially the support substrate. In some embodiments the silver aggregates are not more than about 15% by weight of the composite material. In some embodiments the silver aggregates consist of metallic silver.

Provided herein are also methods for reducing or eliminating microorganisms in water or a fluid, comprising providing a composite material and contacting water or fluid with microorganisms with the composite material, wherein the microorganisms in the water or fluid are reduced or eliminated from the water or fluid. In some embodiments the microorganisms can comprise bacteria type Gram+ or Gram–, micro-fungi, micro-algae, yeast, virus or any combination thereof. In some embodiments contacting the water or fluid with microorganisms comprises providing a device comprising the composite material and a filter, column, bed or structure with a inlet and outlet configured to allow the water or fluid to flow through the device while contacting the composite material. In some embodiments the water or fluid comprises wastewater, grey water, well water, cooling water, condensation water, ballast water, ice production water, drinking water, industrial water, cooling oil or any other fluid susceptible to contain microorganisms.

This object of the presently disclosed subject matter is achieved in whole or in part by the presently disclosed subject matter, and other objects will become evident as the description proceeds when taken in connection with the accompanying Examples as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which.

DETAILED DESCRIPTION

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

Even though all details of the mechanism of action may not be fully understood, the germicidal proprieties of silver (Ag) have been appreciated for some time. Silver has been applied in forms of colloidal silver (Cecil W. Chambers et al., *Ind. Eng. Chem.,* 1953, 45 (11), 2569-2571), or more recently, as silver nanoparticles (Mahendra Rai et al., 2009, *Biotechnology Advances,* 27(1), 76-83). Unfortunately, all of these forms are still used as chemical additions to water. Even silver compounds on supports (Shuting Zhang et al., 2004, *Carbon,* 42(15), 3209-3216; Xiaole Zhang et al., 2011, *Colloids and Surfaces A: Physicochemical and Engineering Aspects,* 375(1-3), 186-192; R. K. Sharma et al., 1990, *Journal of Environmental Science and Health. Part A: Environmental Science and Engineering and Toxicology,* 25(5), 479-486; Bright Kwakye-Awuah et al., 2007, *Journal of Applied Microbiology,* ISSN 1364-5072), all of which are considered as silver dispensers, are highly limited by the difficulty of bonding silver particles to supports and, at the same time, keeping their germicidal activities. If made to be too stable such compounds can have no or limited germicidal activity, while insufficient stability of the silver particles can cause silver leaching. This balance between the silver stability and its germicidal activity condemns, for now, those materials to remain at laboratory scale.

Disclosed herein is a material that allows a high silver stability together with a high germicidal activity that permits the disinfection of water and other media without any (or substantially no) chemical addition. The disclosed materials further provide germicidal active surfaces on composite materials.

The present disclosure describes composite materials or compounds that, by their particular chemical composition and chemical bounding, allows a high stability of silver active aggregates at the surface of the material, which provides germicide capacities to the material itself. Also, the present disclosure describes methods and chemical compositions of the ingredients that can provide for the formation and the stability of the silver active aggregates at the surface of the composite material. Moreover, the present disclosure describes conditions under which the composite material with germicidal surfaces functions as a water (or other liquid media) disinfectant.

Figure 1:
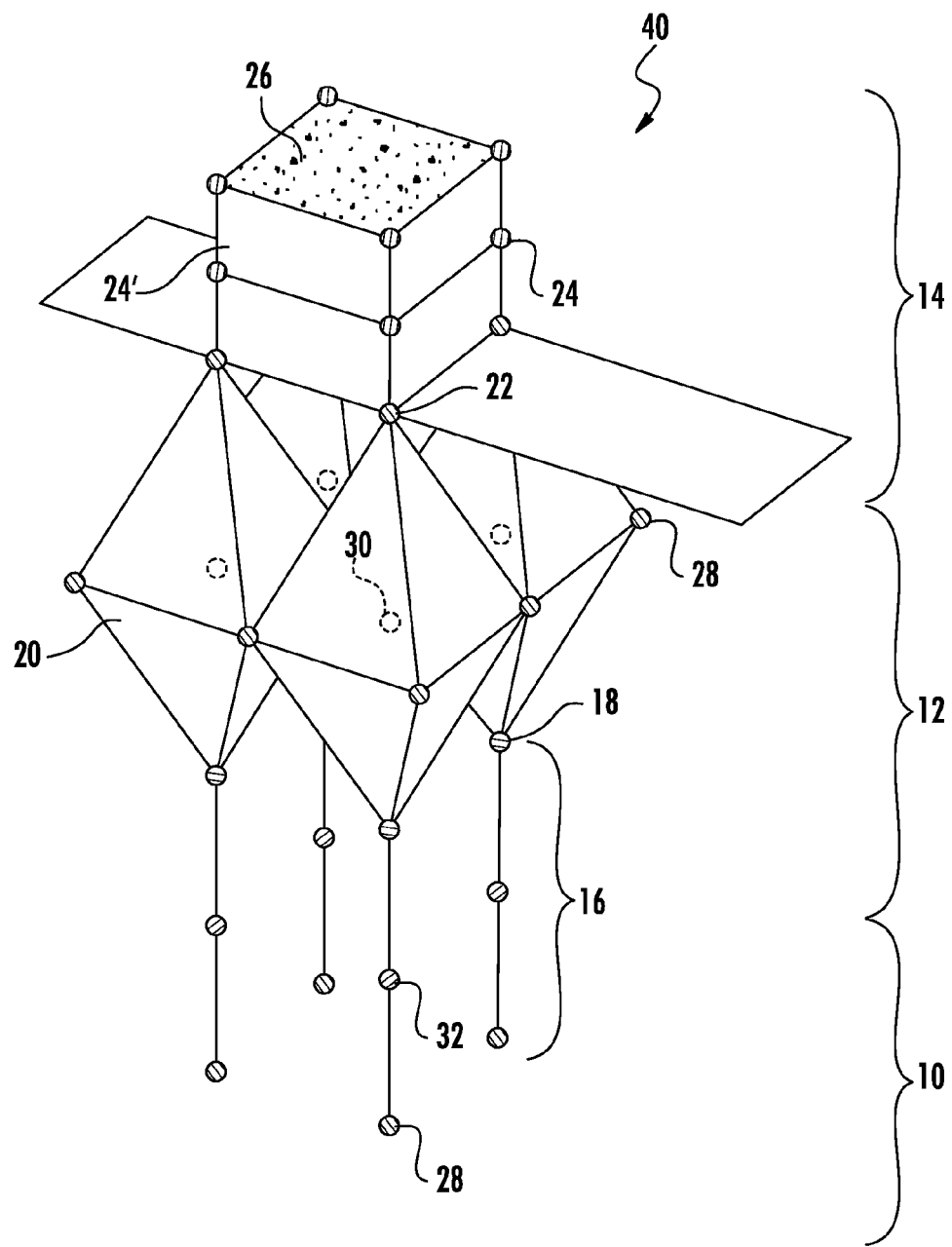
FIG. 1 is a schematic illustration of the structural disposition and combination between the three components of the disclosed composite materials, including: (I)—composite 10 represented by porous ceramics such as silica or alumina; (II)—composite 12 represented by $TiO_2$ aggregates with Cl atoms into their structure having the role of chemical bonding material for composite 14 represented by the silver aggregates that are forming the material germicide surface. Reference numerals in the FIG. 1 are as follows:
10: is the support substrate, e.g. porous ceramic
12: is the titanium oxide aggregates
14: is the silver aggregates
16: is the silica or alumina bulk
18: are the oxygen atoms that were at the surface before aggregates formed
20: are the titanium oxide aggregates
22: are the chloride atoms
24: are the silver aggregates
26: is the germicide surface
28: are the oxygen atoms
30: are the titanium atoms
32: are the silicon or aluminum atoms

Without being limited by a particular theoretical interpretation, it is considered that in the composite material the germicidal phase can in some aspects be imparted by the phase (III), i.e. the silver aggregates, or composite 14 FIG. 1.

Moreover, without being limited by a particular theoretical interpretation, in some aspects the phase (II), i.e. the aggregates of titanium dioxide with chlorine atoms (composite 12 in FIG. 1), role can be to welcome and chemically bond the silver aggregates (phase (III)), precisely with the chlorine atoms acting like chemical "nails".

Again, without being limited by a particular theoretical interpretation, a primary aim of the ceramic support (phase (I), either silica gel based or alumina based, composite 10 in FIG. 1) can be to facilitate and support the in situ growth, on and/or above the surface of the ceramic support, of the titanium dioxide aggregates with chloride atoms (phase II)), precisely by their rich amount of OH sites at the surfaces of the ceramics. In some embodiments, any type of ceramics with the same amount of OH at their surface like the silica gel or alumina can be used as support for the composite material.

Further, by way of example and without limiting the scope of the instant disclosure, the disclosed composite material can in some aspects contain the phases (I, II and III, or 10, 12 and 14 in FIG. 1) and thereby provide germicide capacities due to the stable silver aggregates at its surface which are considered, after calcination, as integrally part of the material. Thus, the composite material has germicidal surfaces.

Without being restricted by any theoretical interpretation, the porous ceramics used as a support can in some aspects be silica gel based, alumina based, zeolite based or any other ceramic support as long as it has a sufficient quantity of OH sites.

In some embodiments, the ceramic support can comprise silica gel ($SiO_2$), completely amorphous or partially crystallized into quartz.

In some other embodiments, the ceramic support can be alumina ($Al_2O_3$) completely amorphous or partially crystallized into Alpha ($\gamma$-$Al_2O_3$).

In some embodiments the specific area of the porous ceramic supports can range between about 150 to about 500 $m^2/g$. In some other embodiments, the specific area of the silica gel can range from between about 420 and about 460 $m^2/g$, or more precisely about 440 $m^2/g$. In some embodiments, the specific area of alumina can range between about 240 and 280 $m^2/g$, or more precisely around 260 $m^2/g$.

Without being restricted by any theoretical interpretation, the porous ceramics used as the support can be monoporous with porous size ranging between about 5 and about 15 nm, more precisely about 10 nm.

It can be difficult to chemically bond silver (in any form) to ceramics or other porous materials and, at the same time, keep the germicide capacities of the silver. In other words, if the silver is to bond to the support (in techniques like adding silver nanoparticles in the support row material as previously step in the support manufacturing process, etc.), the silver may no longer have germicide proprieties after being bonded to the support. Therefore, the only option remaining is the physical adsorption of silver nanoparticles on porous supports or their creation in situ on the porous supports from silver solutions, and like this the created silver nanoparticles will be physically linked to the supports. In all these cases, the materials are actually dispensers of active silver nanoparticles. From this perspective, the aim of the present disclosure is the presence of the titanium dioxide aggregates with chlorine atoms embodied into the TiO structure and acting as chemical "nails" between the porous supports and silver aggregates.

Without being restricted by any theoretical or analytical interpretation, applicant has found that at least one method of growing in situ the TiO micro-aggregates is the Chemical Vapour Deposition—Molecular Layering technique. Additionally, applicant has found that in some embodiments where a titanium dioxide precursor is strictly used, titanium chloride ($TiCl_4$) can be used in order to provide the chloride residue atoms that will chemically attach, i.e. "nail" the silver.

In some embodiments the TiO aggregates with Cl atoms in their structure are partially or totally crystallized in anatase structures.

In other embodiments, the TiO aggregates with Cl atoms in their structure can be 0.5, 1, 2, 3, 4, 5, 6, 7, 8, 9, 10, 11, 12, 13, 14 or 15 microns in size. In some other embodiments the TiO aggregates with Cl atoms in their structure are between about 5 and about 8 micrometers in size, more precisely 6.5 μm.

In some embodiments the TiO aggregates with Cl atoms in their structure are partially or entirely covering the ceramic support surfaces. Applicant found that the more active surfaces are the ones where the TiO aggregates with Cl atoms cover entirely the ceramic surfaces.

Without being restricted by any theoretical interpretation, applicant found that one suitable method for growing in situ silver aggregates is Dry Impregnation. Additionally, applicant found that the silver precursor could be silver nitrate salt ($AgNO_3$).

In some embodiments the silver nanoparticles can be larger than about 250 nm and can reach up to about 700 nm or even more, e.g. about 1 micrometer. In some embodiments, applicant found that the silver aggregates that are chemically bound to the ceramic surfaces are around 500 nm in size.

In some other embodiments, the silver aggregates can be completely or partially covering the titanium dioxide aggregates. Applicant found that the most active surfaces are the ones where the silver aggregates cover completely the TiO aggregates.

Again, in some embodiments, silver aggregates are partially or entirely crystallized in cubic shapes. Applicant found that the surfaces with the most germicidal activity are the ones in which the silver aggregates are entirely crystallized in cubic shapes.

FIG. 1 schematically depicts the physical-chemical structure of the composite material at a molecular level. Support (composite (I), or composite 10, in FIG. 1) is represented by the porous ceramics that are rich in OH surface sites. Those OH sites provide the oxygen (O) that becomes the chemical nails for the growth in situ of the TiO aggregates with Cl atoms in diamond shapes that cover the porous ceramic surface (composite (II), or composite 12, in FIG. 1).

In some embodiments the Cl atoms act as binding agents, or "nails", for the in situ growth of the germicide silver aggregates in cubic shapes (composite (III), or composite 14, in FIG. 1).

FIG. 1 schematically depicts the physical-chemical structure of the composite material at a molecular level. FIG. 1 illustrates schematically the structural disposition and combination between at least three components of the composite material 40, including in some embodiments a first composite portion 10 comprising porous ceramics such as silica or alumina, a second composite portion 12 comprising TiO aggregates 20 with Cl molecules 22 embedded therein and configured to chemically bond material in a third composite portion 14 comprising silver aggregates 24 and 24' that form a material germicidal surface 26. First composite portion 10 can comprise porous ceramics such as silica 32 or alumina 32 to form a silica or alumina bulk 16 (generally amorphous), including oxygen 28 molecules and oxygen 18 molecules that were OH sites at the surface of the porous ceramic support before TiO aggregate 20 formation. The TiO aggregates 20, including titanium molecules 30, with Cl molecules 22 (partially or completely crystallized into anatase diamonds) form second composite portion 12 comprising a TiO aggregate layer. Chloride molecules 22 can act as chemical nails, or chemical binding sites, for silver molecules to provide for the formation and chemical bonding of aggregates 24 and 24'. Silver aggregates partially 24 or completely 24' crystallized into cubic shapes provide for a germicidal surface 26 of composite material 40.

First composite portion 10, comprising porous ceramics such as silica or alumina, also referred to as a support or support material, can comprise porous ceramics that are rich in OH (hydroxide) surface sites. In some embodiments these OH sites can provide the oxygen (O) that can become the chemical nails or chemical binding sites for the growth in situ of the TiO aggregates with Cl molecules in diamond shapes that cover the porous ceramic surface, as depicted by second composite portion 12 (comprising TiO aggregates 20 with Cl molecules 22 embedded therein). In some embodiments the Cl molecules act as binding agents forming chemical bonds or "nails" for the in situ growth of the germicide silver aggregates in cubic shapes in the third composite portion 14.

The disclosed composite materials, comprising in some embodiments up to the three components, depicted as first 10, second 12 and third 14 composite portions, respectively, can have powerful germicide surfaces that can irreversibly destroy any microorganism with which it comes into direct contact. As is shown in the below Examples, in some cases the germicide activity of the disclosed composite materials can reach about 75% to about 90% efficacy or efficiency, about 80% to about 95% efficacy or efficiency, about 85% to about 99% efficacy or efficiency, and as much as about 99.9% efficacy or efficiency. These performances can in some aspects be reached without any energetic activation (e.g., heat, light, electricity or other) of the composite material.

The disclosed composite materials, comprising the three components (10, 12 and 14), can have powerful germicide surfaces that can irreversibly destroy the microorganisms with which it comes into direct contact. As is shown in the below examples, in some cases the germicide activity of the disclosed composite materials can reach as much as 99.9% efficiency. These performances are reached without any energetic activation (e.g., heat, light, electricity or other) of the composite material.

The present disclosure also describes a method for reducing or completely eliminating microorganisms from water or a fluid comprising a step of bringing the water or fluid into contact with the composite material having germicide surfaces.

In some cases, the microorganisms can comprise bacteria, type Gram+ or Gram−, micro-fungi, micro-algae, yeast or virus or any mixture of those.

Without being restricted by any theoretical interpretation, the composite material with germicide surfaces according to this disclosure can be used for the disinfection of waters like wastewater, grey water, well water, cooling water, condensation water, ballast water, ice production water, drinking water, and industrial water, as well as air, cooling oil or any other fluid, fluids or medium susceptible to contain microorganisms.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any compositions, methods, devices, and/or materials similar or equivalent to those described herein can be used in the practice or testing of the presently disclosed subject matter, representative compositions, methods, devices, and/or materials are now described.

Following long-standing patent law convention, the terms "a", "an", and "the" refer to "one or more" when used in this application, including the claims. Thus, for example, reference to "a microorganism" includes a plurality of such microorganisms, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C and/or D" includes A, B, C and D individually, but also includes any and all combinations and subcombinations of A, B, C and D.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Method for Manufacturing Composite Material with a Germicidal Surface

A. Manufacturing Protocol

At least one method for manufacturing the disclosed composite material with germicidal surfaces can follow these steps (in some embodiments consecutively):

1. TiO aggregates with Cl atoms in situ deposition.

The TiO (Titanium Oxide) aggregates with Cl atoms can be deposited by any Chemical Vapour Deposition—Molecular Layering method familiar to those of ordinary skill in the art, including for example that disclosed in Malygin A. A., 1999, In Book: Natural Microporous Materials in Environmental Technology: Kluwer Academic Publishers, 487-495. One parameter that is different in the presently disclosed subject matter as compared to Malygin, 1999, is the temperature. Particularly, in this example the CVD-ML reactors are equipped at temperatures between about 200° C. and 400° C., and in some embodiments about 300° C. during all CVD-ML process (in contrast to 550-600° C. as described by Malygin A. A., 1999).

Such a method can comprise the following:

1.1) The silica gel (or the alumina) porous support are introduce into the CVD-ML reactors (0.5 to 5 kg, more exactly 3.3 kg). Dry air is flowed in the reactors with a continuous flow rate that not exceed 10 L/min in order to dry the ceramic surface; This step may term 2 to 4 hours, more exactly 3 hours.

1.2) The TiCl4 vapors, the TiO2 precursor, are introduced into the CVD-ML reactors (flow rate equal to 300 ml/min) until the synthesis of the titanium dioxide primary forms; This step can take 2 to 4 hours, more exactly 3 hours.

1.3) The water vapors are introduced into the CVD-ML reactors at low flows (400 ml/min) in order to hydrolyze the residual chloride molecules; The remain Cl atoms that did not go during this step belong to the TiO2 chemical structure. These Cl atoms are the ones that allow the silver deposit. This step can term between 6 and 10 hours, more exactly 8 hours.

2. The Ag aggregates in situ deposition

The Silver aggregates can be deposited by a dry impregnation method such as that disclosed by A. Jos van Dillen et al., 2003, Journal of Catalysis, 216(1-2), 257-264), and can comprise:

2.1) The silica gel (or alumina) porous support with a layer of TiO aggregates with Cl atoms at its surface is dry (110° C.) and then contacted with a Silver Nitrate solution that fully fills the support pores. The AgNO3 concentration in solution is 15 g/L; 1 L of AgNO3 solution is necessary for 1 kg of ceramics.

2.2) The impregnated supports are kept in pickle until they are almost dry; This step can term at least 1 hour.

2.3) The supports are calcinated at least at 550° C. until the silver aggregates form at the TiO surface.

3. Sample Washing

After calcination, the composite material with germicide surfaces can be washed with bi-distillate water in order to remove all residual silver that is not chemically bond to the TiO aggregates surface. This step is necessary in order to avoid silver leaching during the water disinfection process.

B. Sample List

Both silica and alumina based composite materials where manufactured and evaluated. The sample nomenclature is presented in Table 1 below.

TABLE 1

| No | Sample | Nomenclature |
|---|---|---|
| 1 | $SiO_2$—TiO(Cl)—Ag | S23 |
| 2 | $Al_2O_3$—TiO(Cl)—Ag | A24 |

Example 2

Method for Manufacturing of the Composite Material $SiO_2$—TiO—Ag Based Without Chloride Molecule into the Titanium Dioxide Structure A. Manufacturing Protocol At least one method for manufacturing the disclosed composite material with germicidal surfaces can follow these steps consecutively:

1. TiO aggregates without Cl atoms in situ deposition.

The TiO aggregates without Cl atoms can be deposited by any Chemical Vapour Deposition—Molecular Layering method familiar to those of ordinary skill in the art, including for example that disclosed in Malygin A. A., 1999, In Book: Natural Microporous Materials in Environmental Technology: Kluwer Academic Publishers, 487-495. The CVD-ML reactors are quipped at 550-600° C. like described by Malygin A. A., 1999.

The manufacturing method followed the same steps described at Example 1.

2. The Ag aggregates in situ deposition

The Silver aggregates can be deposited by a dry impregnation method such as that disclosed by A. Jos van Dillen et al., 2003, Journal of Catalysis, 216(1-2), 257-264), and is comprising exactly the same steps that described at Example 1.

3. Sample Washing

After calcination, the composite material with germicide surfaces can be washed with bi-distillate water just like described at Example 1.

B. Sample List

Both silica and alumina based composite materials where manufactured by applicant.

The sample nomenclature is presented in Table 2 below.

TABLE 2

| No | Sample | Nomenclature |
|---|---|---|
| 1 | $SiO_2$—TiO—Ag | S20 |
| 2 | $Al_2O_3$—TiO—Ag | A1 |

Example 3

Physicochemical Characterization of the Ceramics Samples

A. Elementary Characterization of the Ceramic Surfaces

The elementary surface of all 4 samples manufactured as described in the Examples 1 and 2 can be analyzed using a SEM-EDX microscope. Such analysis was completed and assessed. The results demonstrate that the ceramics contain basically the following elements: Si (Al), O, Ti and Ag.

In addition to the basic element, it can be identified at the surface of the samples manufactured due to the method described in Example 1 the presence of Chloride atoms. Those atoms allowed the silver bonding at the ceramic surface. A quality quantification provides an indication that in these embodiments the Cl atoms quality do not exceed 3% mass of both samples, silica and alumina based.

No Chloride atoms are detected using the SEM-EDX microscope at the surface of the 2 samples manufactured due to the method described in the Example 2. Consequently, only some traces of Silver are as well observed at the ceramic surface. These results demonstrate that in some embodiments the silver is only physically adsorbed at the ceramic surfaces and not chemically bound.

Example 4

Use of the Composite Material with Germicidal Surfaces for Water Disinfection

A. Test Protocol

Figure 2:
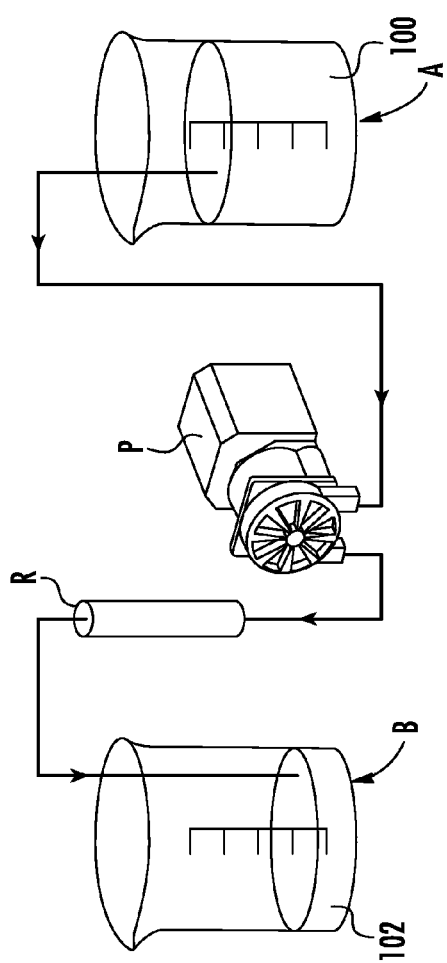
FIG. 2 is a schematic illustration of a test setup for evaluating the germicide capacities of the composite material surface in the context of the present disclosure.

The laboratory tests for the germicide activity determination of the composite material were developed using *Escherichia coli* as test bacteria. The test protocol comprised the following: two recipient containers or vessels (A and B, 5 liters in volume) were connected by a peristaltic pump P, which allowed the transfer of the test solution 100 (distilled water with bacteria, *E. coli*) from the vessel A to vessel B, through a reactor R containing the ceramic samples (FIG. 2). All 4 samples (S23, A24 described in Example 1 and S20, A1 described in Example 2), were tested independently.

The operating parameters are presented in Table 3.

TABLE 3

| Parameter | Value |
| --- | --- |
| Quantity of ceramics sample into the reactor (grams) | 60 |
| Quantity of the test solution (litres) | 5 |
| Bacteria concentration (CFU/ml) | $10^5$-$10^6$ |
| Peristaltic pump flow rate (l/h) | 5 |
| Test duration (min) | 60 |
| Number of sampling each side (upstream and downstream of the reactor) | 4 |

B. Sampling

Figure 3:
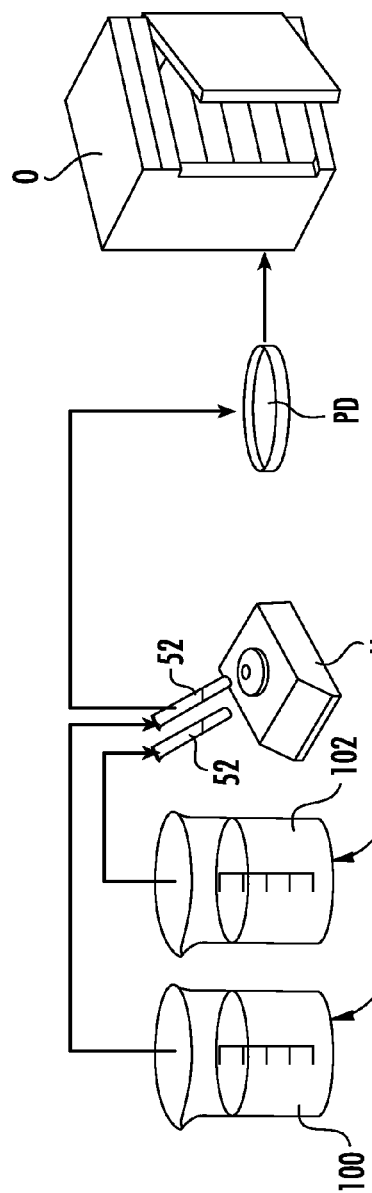
FIG. 3 is a schematic illustration of the sampling protocol for the tests realized in order to evaluate the germicide capacities of the composite material surface in the context of the present disclosure.

Two 5 ml samples 52, one upstream (sample 100) and another downstream (sample 102) from the reactor R, were taken at different time intervals (every 20 min). From those 5 ml samples a 25 ul sub-sample was taken from each and transferred and plated in Petri dishes PD containing a Luria Broth (LB) nutrient gel. To optimize accuracy two samples were taken from two different points. The plates were then placed in incubation in an oven O (16 h at 37° C.) to promote the development of bacterial colonies for visual counting. The above testing and sampling approach is illustrated in FIG. 3.

C. Results

The results are expressed as an average of the bacterial concentration upstream (Beaker A) compared to those downstream (Beaker B) from the reactor R that contain the germicidal ceramics. The results are expressed in percentage (%).

By counting all the bacterial colonies, the results obtained for the silica based composite material (sample S23) are presented Table 4.

TABLE 4

Germicidal activity of silica composite

| Time (min) | Beaker A | | | Beaker B | | | Activity (%) |
| --- | --- | --- | --- | --- | --- | --- | --- |
| | A' | A" | Average | B' | B" | Average | |
| 0 | 650 | 632 | 641 | 0 | 0 | 0 | 100.00 |
| 20 | 680 | 660 | 670 | 0 | 1 | 0.5 | 99.93 |
| 40 | 645 | 638 | 641.5 | 3 | 1 | 2 | 99.69 |
| 60 | 676 | 760 | 718 | 0 | 0 | 0 | 100.00 |
| Average A: | | | 667.6 | Average B: | | 0.6 | |
| | | | | | Efficiency (%) | | 99.9 |
| Initial Bacteria concentration (CFU/ml) | | | | | | | 26705 |
| Eliminated bacteria (CFU/ml) | | | | | | | 26680 |

By counting all the bacterial colonies, the results obtained for the alumina based composite material (sample A24) are presented Table 5.

TABLE 5

Germicidal activity of alumina composite

| Time (min) | Beaker A | | | Beaker B | | | Activity (%) |
| --- | --- | --- | --- | --- | --- | --- | --- |
| | A' | A" | Average | B' | B" | Average | |
| 0 | 650 | 632 | 641 | 1 | 1 | 1 | 99.84 |
| 20 | 680 | 660 | 670 | 0 | 1 | 0.5 | 99.93 |
| 40 | 645 | 638 | 641.5 | 1 | 1 | 1 | 99.84 |
| 60 | 676 | 760 | 718 | 1 | 0 | 0.5 | 99.93 |
| Average A: | | | 667.6 | Average B: | | 0.8 | |
| | | | | | Efficiency (%) | | 99.9 |
| Initial Bacteria concentration (CFU/ml) | | | | | | | 26705 |
| Eliminated bacteria (CFU/ml) | | | | | | | 26675 |

As can be seen, both composite materials (silica based and alumina based composite materials with germicidal surfaces) have germicidal activities at their surfaces near 100% such that they achieved a 99.9% efficiency in killing the bacterial within a single pass.

By counting all the bacterial colonies, the results obtained for the alumina based composite material manufactured due to the method described in Example 2 (sample A1) are presented in Table 6:

TABLE 6

Germicidal activity of alumina composite

| Time (min) | Beaker A | | | Beaker B | | | Activity (%) |
| --- | --- | --- | --- | --- | --- | --- | --- |
| | A' | A" | Average | B' | B" | Average | |
| 0 | 650 | 632 | 641 | 560 | 580 | 570 | 11.08 |
| 20 | 680 | 660 | 670 | 612 | 620 | 616 | 8.06 |
| 40 | 645 | 638 | 641.5 | 630 | 645 | 637.5 | 0.62 |
| 60 | 676 | 760 | 718 | 712 | 710 | 711 | 0.97 |
| Average A: | | | 667.6 | Average B: | | 633.6 | |
| | | | | | Efficiency (%) | | 5.1 |
| Initial Bacteria concentration (CFU/ml) | | | | | | | 26705 |
| Eliminated bacteria (CFU/ml) | | | | | | | 1360 |

By counting all the bacterial colonies, the results obtained for the silica based composite material manufactured due to the method described in Example 2 (sample S20) are presented in Table 7:

TABLE 7

Germicidal activity of silica composite

| Time (min) | Beaker A | | | Beaker B | | | Activity (%) |
|---|---|---|---|---|---|---|---|
| | A' | A" | Average | B' | B" | Average | |
| 0 | 650 | 632 | 641 | 545 | 512 | 528.5 | 17.55 |
| 20 | 680 | 660 | 670 | 600 | 620 | 610 | 8.96 |
| 40 | 645 | 638 | 641.5 | 643 | 612 | 627.5 | 2.18 |
| 60 | 676 | 760 | 718 | 702 | 712 | 707 | 1.53 |
| Average A: | | | 667.6 | Average B: | | | 618.2 |
| | | | | | | Efficiency (%) | 7.4 |
| Initial Bacteria concentration (CFU/ml) | | | | | | | 26705 |
| Eliminated bacteria (CFU/ml) | | | | | | | 1975 |

As can be seen, applicant found that in these operational conditions, both composite materials (silica based and alumina based composite materials) manufactured due to the method described in Example 2 have germicide activities that do not exceed 7.5% efficiency average. Moreover, applicant found that the germicide activity decreases progressively in time which is evidence that the silver is not chemically bound to the ceramic surfaces and ones detached from the ceramic supports, the samples lose their germicide activity. See Table 8.

TABLE 8

Summary of all the obtained results

| Sample | Ceramic support | Chloride atoms in the TiO structure | Manufacturing method | Germicide activity (average %) |
|---|---|---|---|---|
| S23 | silica | yes | Example 1 | 99.9 |
| A24 | alumina | yes | Example 1 | 99.9 |
| S20 | silica | no | Example 2 | 7.4 |
| A1 | alumina | no | Example 2 | 5.1 |

REFERENCES

Cecil W. Chambers et al., *Ind. Eng. Chem.*, 1953, 45 (11), 2569-2571)
Bright Kwakye-Awuah et al., 2007, *Journal of Applied Microbiology*, ISSN 1364-5072)
Mahendra Rai et al., 2009, *Biotechnology Advances*, 27(1), 76-83)
R. K. Sharma et al., 1990, *Journal of Environmental Science and Health. Part A: Environmental Science and Engineering and Toxicology*, 25(5), 479-486
Shuting Zhang et al., 2004, *Carbon*, 42(15), 3209-3216
Xiaole Zhang et al., 2011, *Colloids and Surfaces A: Physicochemical and Engineering Aspects*, 375(1-3), 186-192

All references listed in the instant disclosure, including but not limited to all patents, patent applications, and scientific journals are incorporated herein by reference in their entireties to the extent that they supplement, explain, provide a background for or teach methodology, techniques and/or compositions employed herein.

The description herein describes embodiments of the presently disclosed subject matter, and in some cases notes variations and permutations of such embodiments. This description is merely exemplary of the numerous and varied embodiments. The description or mentioning of one or more representative features of a given embodiment is likewise exemplary. Such an embodiment can typically exist with or without the feature(s) mentioned; likewise, those features can be applied to other embodiments of the presently disclosed subject matter, whether listed in this summary or not.

It will be understood that various details of the presently disclosed subject matter may be changed without departing from the scope of the presently disclosed subject matter. Furthermore, the foregoing description is for the purpose of illustration only and not for the purpose of limitation.

What is claimed is:

1. A composite material with a germicidal surface comprising:
   a support substrate;
   one or more micrometric aggregates of titanium oxide on the support substrate, the titanium oxide aggregates comprising chloride atoms, wherein the titanium oxide aggregates are of a size greater than about 500 nm and up to about 750 nm; and
   one or more micrometric aggregates of metallic silver attached to the chloride atoms of the titanium oxide aggregates, wherein the metallic silver aggregates are of a size greater than about 500 nm and up to about 750 nm,
   wherein the micrometric aggregates of titanium oxide with metallic silver atoms have a germicidal activity.

2. The composite material according to claim 1, wherein the support substrate comprises a silica gel or activated alumina, wherein the support substrate comprises a surface area of at least 50 $m^2/g$ and not more then 850 $m^2/g$.

3. The composite material according to claim 1, wherein the of aggregates of titanium oxide with chloride atoms comprise no more than about 5 to about 7% by weight of the composite material.

4. The composite material according to claim 1, wherein the silver aggregates are not more than about 15% by weight of the composite material.

5. A method for reducing or eliminating microorganisms in water or a fluid, comprising:
   providing a composite material of claim 1; and
   contacting water or fluid with microorganisms with the composite material,
   wherein the microorganisms in the water or fluid are reduced or eliminated from the water or fluid.

6. The method of claim 5, wherein the wherein the microorganisms comprise bacteria type Gram+ or Gram−, micro-fungi, micro-algae, yeast, virus or any combination thereof.

7. The method of claim 5, wherein contacting the water or fluid with microorganisms comprises providing a device comprising the composite material and a filter, column, bed or structure with a inlet and outlet configured to allow the water or fluid to flow through the device while contacting the composite material.

8. The method of claim 5, wherein the water or fluid comprises wastewater, grey water, well water, cooling water, condensation water, ballast water, ice production water, drinking water, industrial water, cooling oil or any other fluid susceptible to contain microorganisms.

* * * * *